United States Patent [19]

Shirasaki et al.

[11] Patent Number: 5,189,607
[45] Date of Patent: Feb. 23, 1993

[54] METHOD FOR SENDING SELECTED DATA FROM ELECTRONIC CASH REGISTERS TO A HOST UNIT

[75] Inventors: Takashi Shirasaki, Nara; Toshifumi Nishii; Yukihiko Oka, both of Yamatokooriyama; Kunihiro Miyamoto, Tenri, all of Japan

[73] Assignee: Sharp Kabushiki Kaisha, Osaka, Japan

[21] Appl. No.: 733,978

[22] Filed: Jul. 22, 1991

Related U.S. Application Data

[63] Continuation of Ser. No. 264,879, Oct. 31, 1988, abandoned.

[30] Foreign Application Priority Data

Oct. 31, 1987 [JP] Japan .................................. 62-276285
Oct. 31, 1987 [JP] Japan .................................. 62-276286

[51] Int. Cl.[5] ............................................. G06F 15/21
[52] U.S. Cl. ........................................................ 364/405
[58] Field of Search ................. 364/401, 405, 406, 408

[56] References Cited

U.S. PATENT DOCUMENTS

| | | | |
|---|---|---|---|
| 4,425,619 | 1/1984 | Matsuda et al. ..................... | 364/405 |
| 4,502,120 | 2/1985 | Ohnishi et al. ...................... | 364/405 |
| 4,508,962 | 4/1985 | Yamasaki ........................ | 364/405 X |
| 4,594,664 | 6/1986 | Hashimoto ............................ | 364/405 |
| 4,751,374 | 6/1988 | Nose ..................................... | 235/380 |
| 4,771,382 | 9/1988 | Shiono et al. ....................... | 364/405 |
| 4,887,209 | 12/1989 | Sugishima ............................ | 364/405 |
| 4,893,236 | 1/1990 | Ohnishi et al. ...................... | 364/405 |

FOREIGN PATENT DOCUMENTS

0267614 1/1987 European Pat. Off. .
62-249297 10/1987 Japan .
2176921 1/1987 United Kingdom .

OTHER PUBLICATIONS

English language translation of JP 56-118167, (Ishii) Sep. 17, 1981.
"Searching Dialog-The Complete Guide", Aug. 1987, pp. 1-1 to 1-14.

*Primary Examiner*—Gail O. Hayes

[57] ABSTRACT

A data transmission device includes a memory for storing a plurality of data consisting of a plurality of sorting areas. The device selectively transmits the data of the sorting area including a desired data in response to a predetermined command signal. Data of the sorting areas including data not desired may not be sent. A central processing unit is connected to each of the electronic cash registers through one or more communication lines and when the electronic cash register receives a command signal sent from the central processing unit, the electronic cash register acts according to the command signal to send specific data.

5 Claims, 8 Drawing Sheets

METHOD FOR SENDING SELECTED DATA FROM ELECTRONIC CASH REGISTERS TO A HOST UNIT

This application is a continuation of application Ser. No. 07/264,879 filed on Oct. 31, 1988 now abandoned.

BACKGROUND OF THE INVENTION

1. Field of the Invention

The present invention relates to a data transmission device which is preferably applicable to a sales management system for example a system in which a host computer that is provided in a head office is connected to an electronic cash register provided in each of branch stores through one or more on-line circuits.

2. Description of the Prior Art

In the prior art, there has been used a sales management system, wherein a main store or central processing office having a host unit such as a computer is connected to each of branch stores. The connection is through an on-line circuit so that sales data as an example, transmitted from an electronic cash register provided in each of the branch stores are integrally processed by a host computer provided in the main store or in the central processing office. For example, a unit price of each of the goods and a code of each division ('division' means a minimum sorting category representing goods in the same category having the same price hereinafter) are transmitted from the host computer to the electronic cash register in each of the branch stores. With this structure the performance of sales managements of all the branch stores integrally associated by means of the host computer.

In such a sales management system as described above, in order to sum up the gross sales of all the branch stores in a day, the sales data of each of the branch stores are sent from the electronic cash register in each of the branch stores to the host computer in the main store.

Moreover, in the case that there is provided a main (primary) apparatus which can be a cash register and a plurality of additional (secondary) apparatuses which can be electronic cash registers in each of the branches in such a sales management system, the main electronic cash register can perform a plurality of functions. The functions being for example, performing inspection and liquidation, transferring data sent from the host computer and data set in the main electronic cash register to a plurality of additional electronic cash registers provided in each of the branches, and a function of performing a process of opening and closing the stores.

In the prior art, in the case of transmitting sales data from an electronic cash register provided in each of the branches to the host computer provided in a main store, the data of all the divisions stored in a so called a division file are sent from each of the cash registers to the host computer. In the host computer only the data of the sales division must be retrieved and selected. In such a sales management system, the time for transmitting the data is lengthy resulting in poor transmission efficiency because of the need of useless buffers for the data transmission. Also the processing operation of the host computer becomes complicated in the prior art described.

Moreover, in order to perform the above mentioned functions in the main electronic cash register, an operator skilled in the operation of the main electronic cash register needs to be located in the store where there is provided an additional electronic cash register. Moreover, since the above mentioned functions of the main electronic cash register are performed generally after closing each of the branch stores, an operator of the main register should be located in each of the stores after the closing time of the stores.

SUMMARY OF THE INVENTION

An object of the present invention is to provide a data transmission device solving the above mentioned problem by improving a transmission efficiency and reducing a load of a processing operation in a data receiving station.

Another object of the present invention is to provide a data transmission device, wherein each of the electronic cash registers can be remote as controlled according to a command signal sent from the central processing unit, resulting in the savings of labor and the improved operability of the system.

A data transmission device according to the present invention includes memory means for storing a plurality of data that includes a plurality of kinds of sorting areas. The data of a sorting area including a desired data is transmitted selectively among said plurality of data in response to a predetermined command signal.

Moreover, a data transmission device according to the present invention includes one or more electronic cash registers each of which is connected to the central processing unit through a communication line. When a predetermined command signal is transmitted from the central processing unit to each of the electronic cash registers, each of the electronic cash registers is operated in response to the command signal. Accordingly, data of the sorting areas including no desired data is not be sent, thereby reducing the time for transmission of the data and improving the transmission efficiency.

Moreover, according to the present invention, the central processing unit of the host computer in the head office is connected to each of the electronic cash registers in a branch store through one or more communication lines and when the electronic cash register receives a command signal sent from the central processing unit of the host computer in the head office, the electronic cash register acts according to the command signal mentioned above. Accordingly, one or a plurality of electronic cash registers can be remotely controlled by sending a command signal from the central processing unit of the host computer.

BRIEF DESCRIPTION OF THE DRAWINGS

FIGS. 1 to 4 are drawings showing a first embodiment according to the present invention, wherein FIGS. 5 to 11 are drawings showing a second embodiment according to the present invention, wherein

DETAILED DESCRIPTION OF THE PREFERRED EMBODIMENTS

EXAMPLE 1

Figure 1:
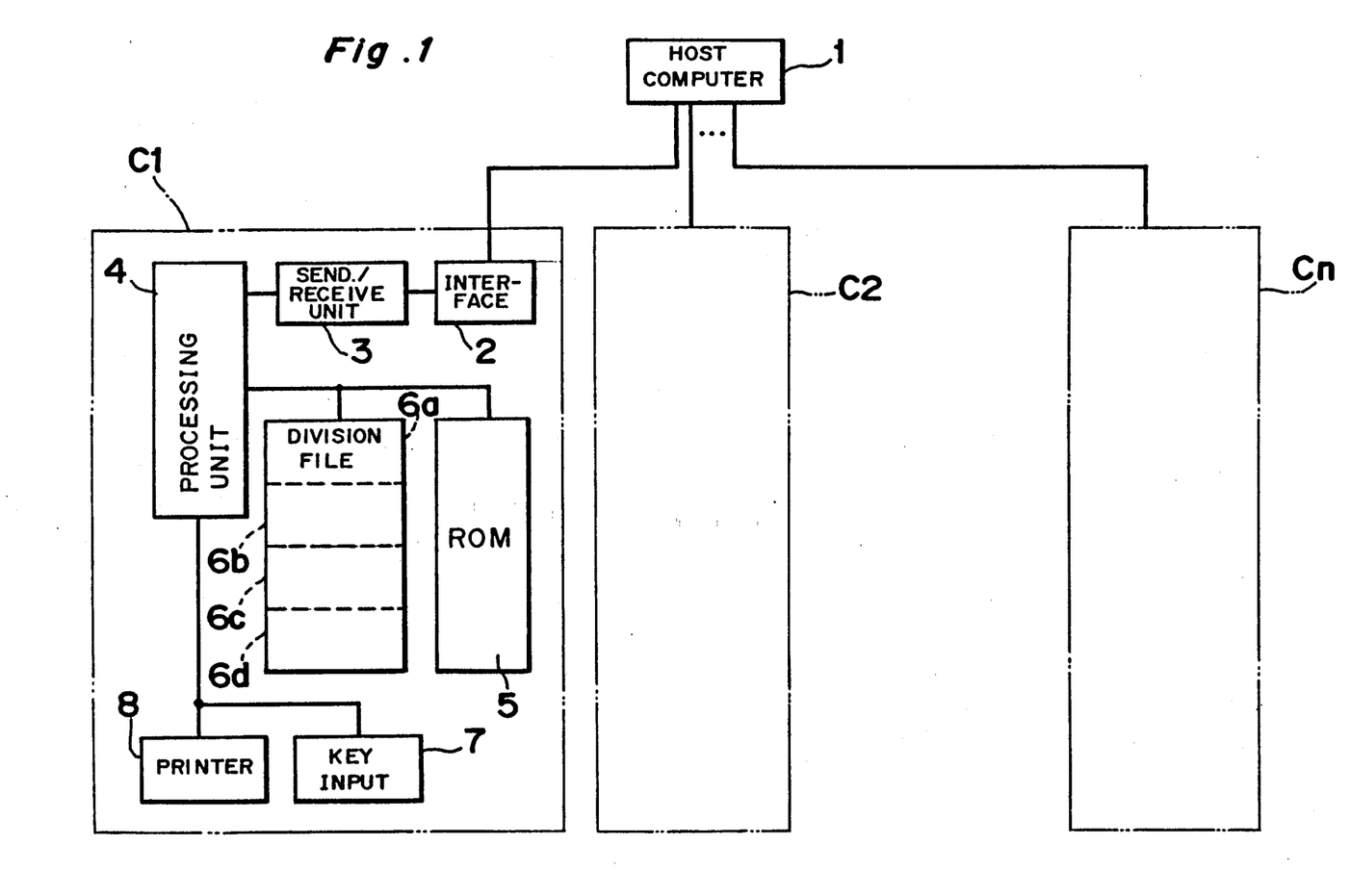
FIG. 1 is a block diagram showing a construction of a sales management system comprising electronic cash registers C of the first embodiment according to the present invention.

In a sales management system as shown in FIG. 1, there is provided a host computer 1 in a main store of an affiliated stores and there is provided electronic cash registers C1 to Cn (represented as C hereinafter) in each of affiliated branch stores, wherein each of the electronic cash registers C having a similar construction is connected to the host computer 1 through an on-line circuit so as to communicate between the host computer 1 and each of the electronic cash registers C.

Each of the electronic cash registers C includes an interface 2, a signal sending/receiving unit 3, a processing unit 4, a read only memory (referred to as ROM hereinafter) 5, a file portion 6, a key input portion 7 and a printer portion 8. The processing unit 4 is connected to the host computer 1 through the signal sending-/receiving unit 3 and through the interface 2 so as to perform the transmission of data between the cash register C and the host computer 1. Also, the processing unit 4 is connected to the ROM 5 for storing a program for registering in the electronic cash register C and is connected to the file portion 6 that contains a plurality of files 6a to 6d formed of such as random access memory (referred to as RAM hereinafter), wherein there is stored a division file e.g. to be described later in the file 6a. Furthermore, the key input portion 7 for registering and the printer portion 8 for printing on sheet e.g. are connected to the processing unit 4 so as to be controlled by the processing unit 4.

In such an electronic cash register C as described above, when sales data per one day is transmitted to the host computer 1, a command signal for sending a desired data is transmitted from the host computer 1 to the electronic cash register C. When the electronic cash register C receives the command signal, the desired data is selected from the file portion 6 in response to the command signal so as to be transmitted to the host computer 1.

Figure 2:
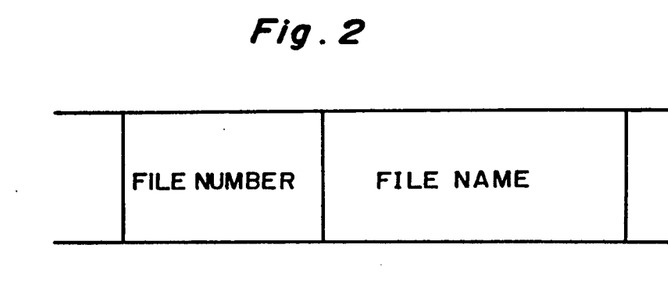
FIG. 2 is a schematic diagram showing an example of a command signal which is transmitted from a host computer 1 to an electronic cash register C.

FIG. 2 shows an example of an arrangement of a command signal which consists of data of a file number and a file name. The file name represents one of the files 6a, 6b, 6c and 6d, and in case of the division file 6a e.g., "DPTFL" is used as the file name.

The file number consists of four figure numeral for example and the head, second and third figures of the numeral represents a sorting area and, for example, in the division file 6a, "012" represents a sorting area AR of a data of sales. As to the lowest figure of the file number, "0" represents the demand for transferring the data of all the divisions and "1" represents the demand for transferring the data of the division in which there is a sale and "2" represents the demand for transferring the data of the division in which there is no sale.

Figure 3:
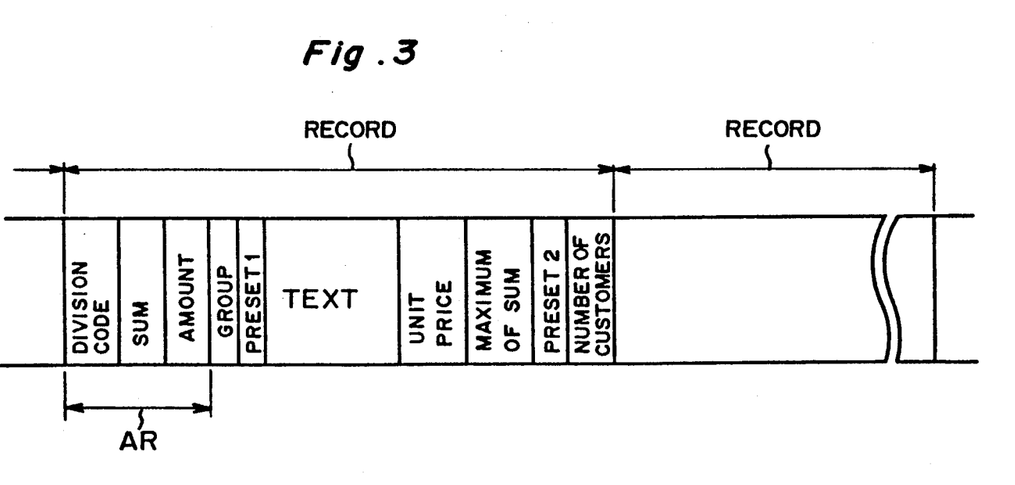
FIG. 3 is a schematic diagram showing an example of a division file 6a which is stored in the electronic cash register C.

FIG. 3 shows a composition of the division file 6a, wherein the data of one division is called 'record'. As shown in FIG. 3, one record consists of a plurality of sorting areas. The sorting area AR of the sales consists of a division code representing a kind of the division, the gross sales of goods in the division and the amount of the sales of the goods in the division. And in the rest of the sorting area AR, there are assigned a code of a group of the goods in the division such as fruits or vegetables, a code of the name of the division, a unit price of the goods of the division, the maximum of the gross sales and the number of the customers having bought a good in the division.

For example, in case the file name of a command signal transmitted from the host computer 1 to the electronic cash register C is "DPTFL", the data in the division file 6a is transmitted from the electronic cash register C to the host computer 1. Moreover, in case the file number is e.g. "0121", only the data of the sales in the division in which there is a sale in the division file 6a (the data represented by the sorting area AR in FIG. 3) is transmitted to the host computer 1.

Figure 4A:
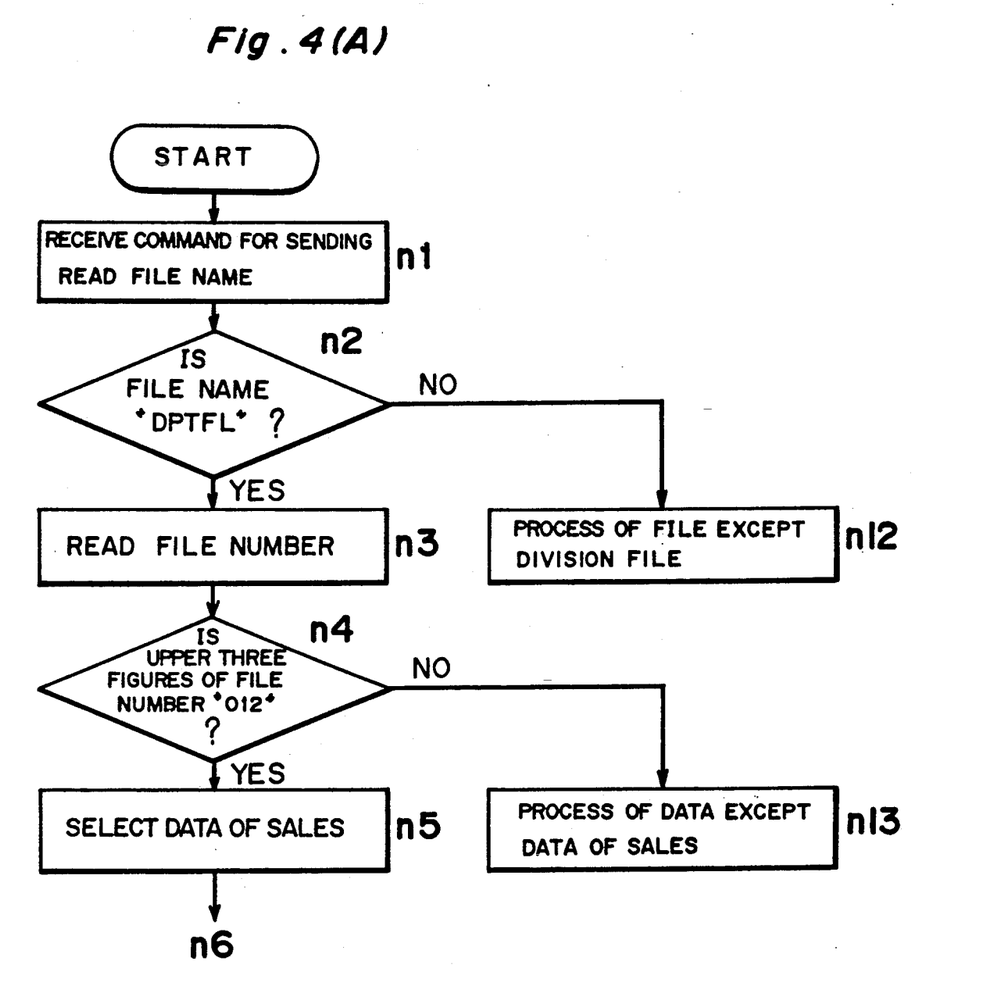
FIGS. 4A and 4B is a flow chart for explaining an operation of the electronic cash register C according to the first example.
Figure 4B:
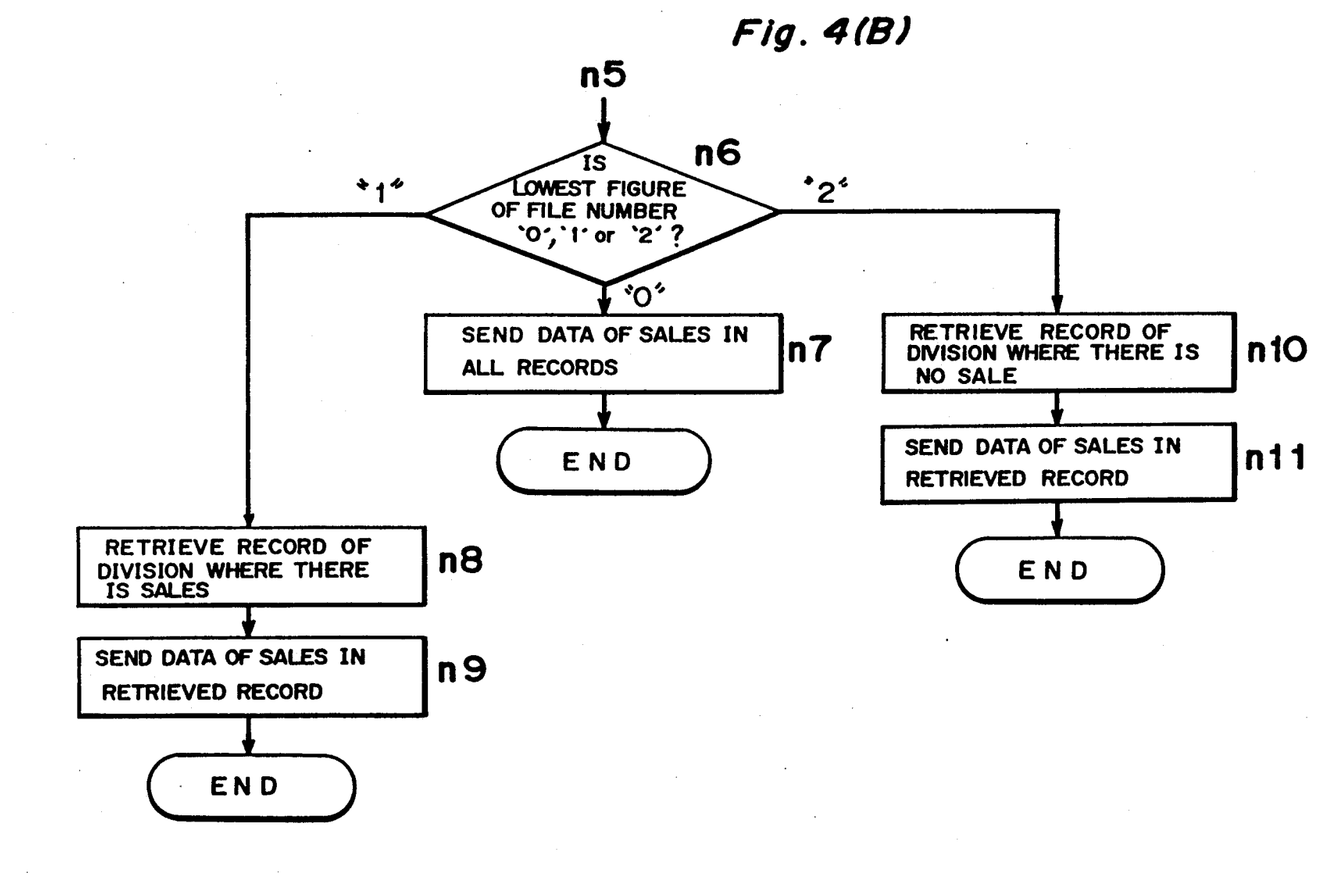

The operation of the electronic cash register C will be explained with reference to FIG. 4.

In step n1, when the electronic cash register C receives a command signal for sending data from the host computer 1, a file name is read out of the command signal demanding for sending data and the program goes to step n2.

In step n2, in case the file name included in the command signal demanding for sending data is e.g. "DPTFL", that is, in case the host computer 1 transmits a demand signal for sending data stored in the division file 6a, the program goes to step n3. If the file name is not "DPTFL" in step n2, the program goes to step n12 and the process corresponding to the file name except the file name "DPTFL" of the division file 6a is similarly performed.

In step n3, the file number is read and the program goes to step n4 and it is judged whether or not the upper three figures of the file number are "012", and in case of "012", i.e., when there is transmitted a demand signal for sending data of the sales from the host computer 1, the program goes to step n5. In case of not "012" in step n4, the program goes to step n13 and a data except the data of the sales is selected to be processed.

In step n5, the data of the sales is selected and the program goes to step n6. It is judged in step n6 whether the lowest figure of the file number is "0", "1" or "2", and in case of "0", the program goes to step n7 and the data of the sales in all of the records in the division file 6a are sent from the electronic cash register C to the host computer 1. In case of "1" in step n6, the program goes to step n8 and a record of the division in which there is a sale is retrieved and next in step n9 a data of the sales in the retrieved record is sent to the host computer 1. In case of "2" in step n6, the program goes to step n10 and a record of a division in which there is no sale is retrieved and next in step n11 a data of the sales in the retrieved record is sent to the host computer 1.

As described above in the first example, the host computer 1 transmits a command signal demanding sending a desired data signal to the electronic cash register C and the desired data is retrieved in the electronic cash register C, so that only the required data can be sent from the electronic cash register C to the host computer 1. Accordingly, the time for transmitting data is decreased and the transmission efficiency is improved and in addition, the labor saving of the host computer 1 can be realized.

In the first example, though there is shown an example of the compositions of the command signal and the division file data, it is obvious to those skilled in the art that other compositions of the command and the division file data can be adopted.

As described above, in the data transmission device according to the present invention, a plurality of data consisting of a plurality of kinds of sorting areas are stored in the memory means and a data of a sorting area including a desired data is only selectively transmitted among said plurality of data and the data of other sorting areas including no desired data is not transmitted. Accordingly, the transmission efficiency can be improved and the processing operation in the data receiving station can be simplified.

EXAMPLE 2

The explanation is made with reference to FIGS. 5 to 11, wherein similar parts are designated by similar numerals and the explanation of the similar parts are omitted.

Figure 5:
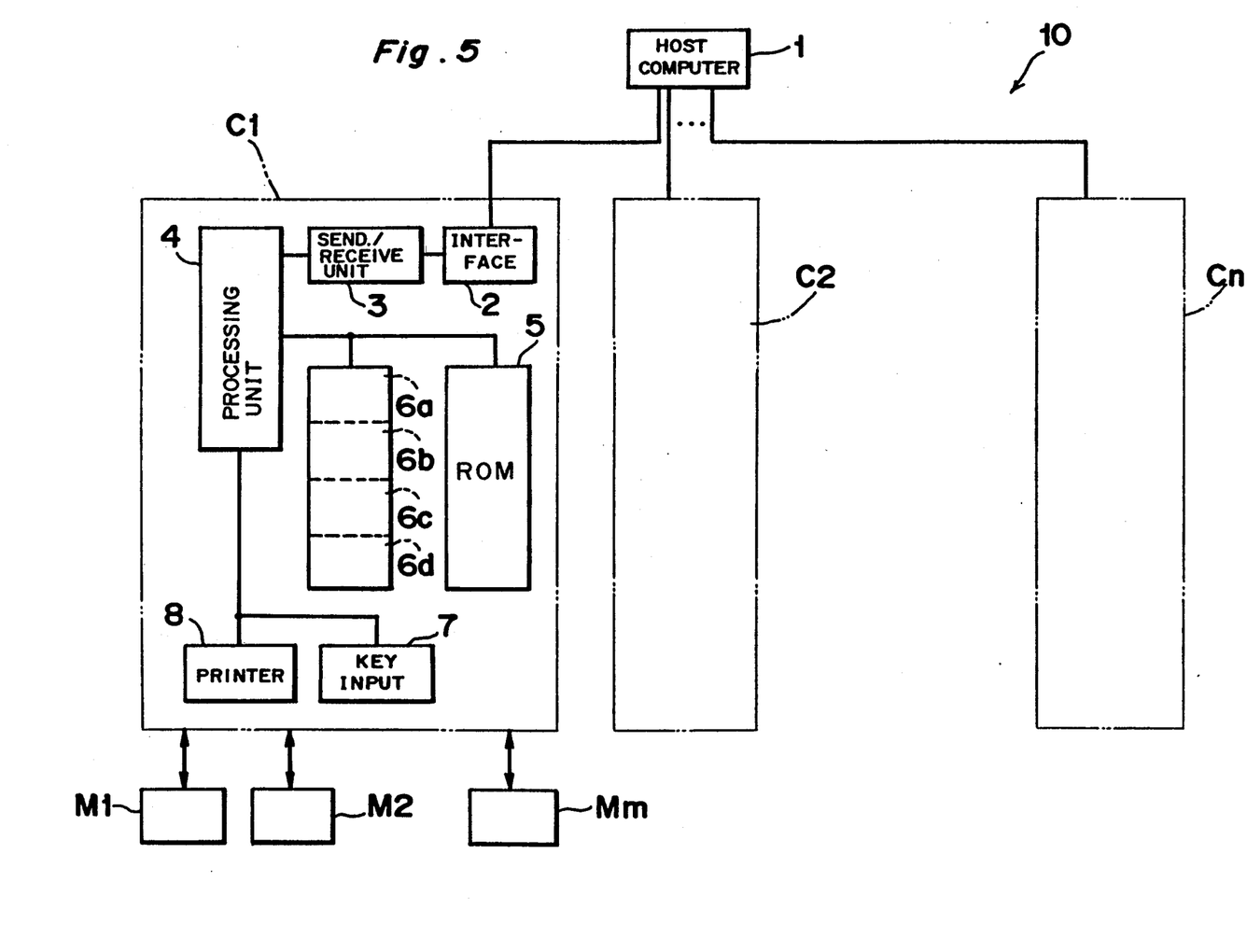
FIG. 5 is a block diagram showing a construction of the second embodiment of a data transmission device 10 of a sales management system according to the present invention.

When an electronic cash register C receives a command signal sent from a host computer 1, the electronic cash register C act in correspondence to the command signal. There are two types of electronic cash registers C, one type having additional apparatuses M1 to Mm such as a case of an electronic cash register C1 and the other type having no additional apparatus such as a case of an electronic cash register C2 as shown in FIG. 5.

Figure 6:
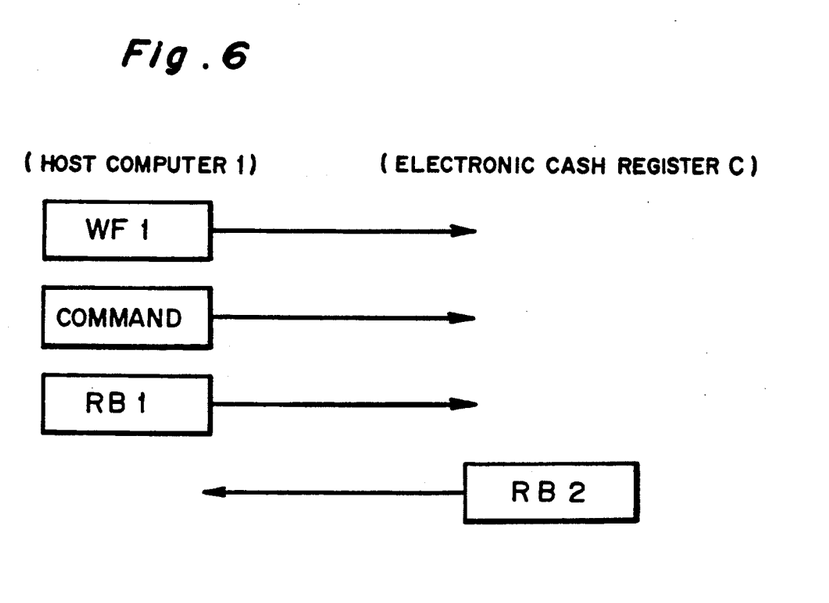
FIG. 6 is a schematic diagram showing flows of the signals when transmitting a command signal from a host computer 1 to an electronic cash register C.

In FIG. 6, a demand signal WF1 demanding for writing in is transmitted from the host computer 1 to the electronic cash register C and when the electronic cash register C receives the signal WF1 demanding for writing in, an area for storing the command signals sent from the host computer 1 is secured in order to receive the data. The command signals are sequentially transmitted from the host computer 1 to the electronic cash register C. The command signals include a data of the operation of the electronic cash register C.

When the transmission of the command signals from the host computer 1 to the electronic cash register C is finished, the finishing signal RB1 is sent to the electronic cash register C. When the electronic cash register C receives the finishing signal RB1, another finishing signal RB2 is transmitted from the electronic cash register C to the host computer 1 for the information of the completion of receipt of the command signal.

As described above, the command signals are transmitted from the electronic cash register C to the host computer 1, whereby the action in response to the command signal is performed in the electronic cash register C.

Figure 7:
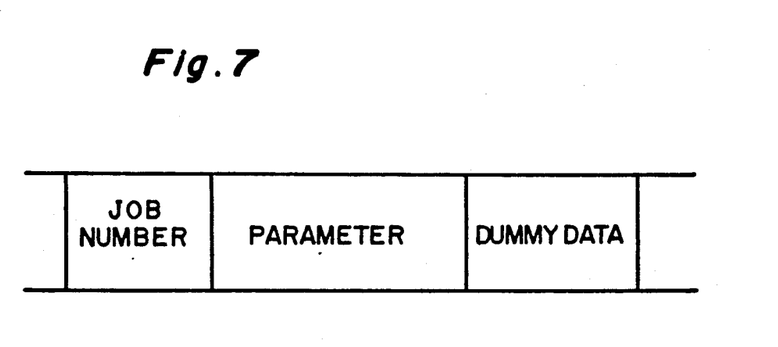
FIG. 7 is a schematic diagram showing the second example of a command signal which is transmitted from the host computer 1 to the electronic cash register C.

FIG. 7, shows a composition of the command signal which is sent from the host computer 1 to the electronic cash register C. The command signal consists of data of job numbers indicating the operation of the electronic cash register C to be performed, various kinds of parameters and dummy data for matching a unit data capacity when sending a data signal. In the electronic cash register C receiving such a command signal as described above, the operation of the electronic cash register C is performed in response to the command signal.

For example, when the job number is "500", in the case that the electronic cash register C is a type of having additional apparatuses M1 to Mm such as a case of the electronic cash register C1 as shown in FIG. 5, a set data and programming data are transmitted to the additional apparatus M so as to perform so called an opening process such as a process of setting a condition to be capable of registering the data in the additional apparatus M. Moreover, when the job number is "501", the electronic cash register C acts so that the additional apparatus M sends the registered data so as to perform a closing process such as a process for prohibiting the operation of each of the additional apparatus M, i.e., a process for turning the power source off.

In the transferring process of the data from the electronic cash register C to the additional apparatus M thereof, when the job number is "850" for example, the data assigned to the key functions of each of the additional apparatus M are transmitted to each of the additional apparatus M so as to set the key functions of the additional apparatus M.

As to the operations of inspection/liquidation, the operations corresponding to the data of the job numbers as shown in the table 1 can be performed by remote control.

TABLE 1

| JOB NO. | PERFORMING OPERATION NAME | | KIND OF OPERATION | |
|---|---|---|---|---|
| | | | Y = 1 | Y = 2 |
| | | | INSPECT  LIQUID. | INSPEC/LIQUID. |
| Y00 | ALL ITEMS | C and ADD. | INS. FOR  LIQ. FOR  ONE DAY  ONE DAY | LIQ. FOR A PERIOD |
| Y01 | | C or INDI-CATED ADD. | INS. FOR  LIQ. FOR  ONE DAY  ONE DAY | — |
| Y30 | TRANS-ACTION | C and ADD. | INS. FOR  INS. FOR  ONE DAY  ONE DAY | — |
| Y30 | | C or INDI-CATED ADD. | INS. FOR  INS. FOR  ONE DAY  ONE DAY | INS. FOR A PERIOD |

Note
1. ADD. represents ADDITIONAL APPARATUS.
2. INS. and LIQ. represent INSPECTION and LIQUIDATION.

In the table 1, the job number "Y" represents a numeral 1 or 2 and when Y=1, it represents a gross in a unit day, when Y=2, it represents a gross in a period such as in a month.

For example, when the job number is "Y00", the data of all the items such as sales in every division, gross sales of all the divisions, sum of discounts in all the transactions, the number and sum of returned goods, the sum and number of the corrections of the data mis-registered by the operators, and the time of money exchanges are individually printed in every item, and if the data of the job number is a data indicating for liquidation with parameters, these numeric data are reset after they are printed.

When the job number is "Y30", the data of the transaction items other than the data of the sales in each division are printed.

In case the electronic cash register C has an additional apparatus M, the total data of the data stored in the electronic cash register C and the data stored in the additional apparatus M are processed in the same way as described above.

Moreover, if the job number is "Y01" and the electronic cash register C and some of the additional apparatuses M are designated with parameters, the sum of the data stored in the electronic cash register C and the data stored in the additional apparatus M throughout the items mentioned above can be printed. Moreover, if the job number is "Y30" and the electronic cash register C and the additional apparatuses M thereof are designated with parameters, the sum of the data stored in the electronic cash register C and the data of the transaction items stored in the designated additional apparatuses can be printed.

Figure 8:
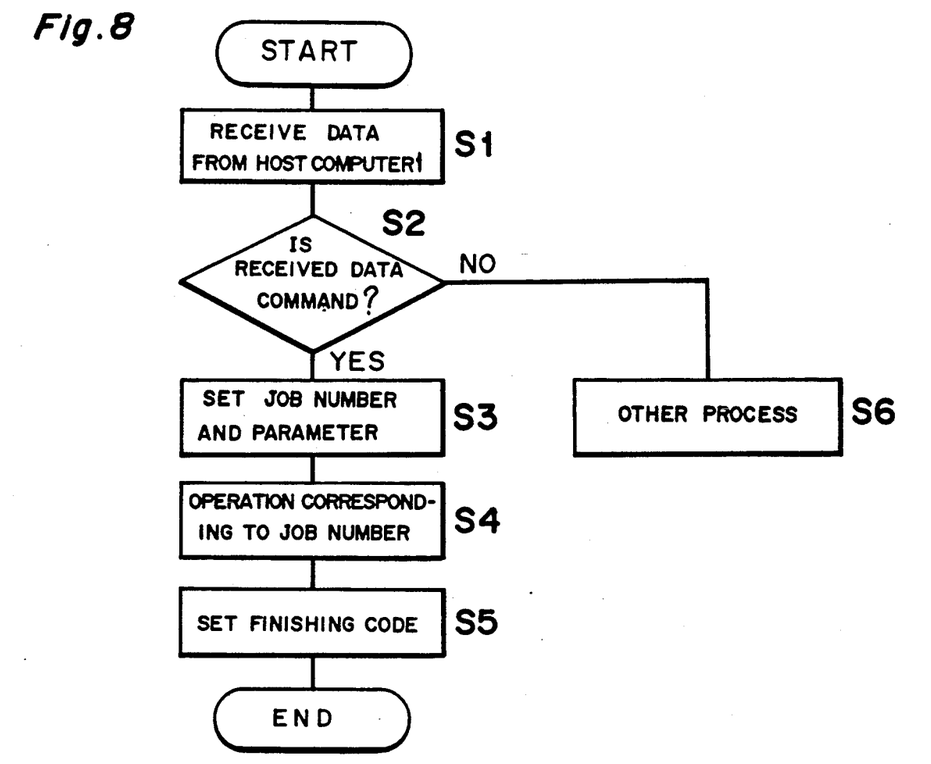
FIG. 8 is a flow chart for explaining an operation of the electronic cash register C according to the second example.

FIG. 8 shows a flow chart for explaining the operation corresponding to the command signal sent from the host computer 1 to the electronic cash register C. In step s1, the electronic cash register C receives a data signal sent from the host computer 1. It is judged in step s2 whether or not the received data signal is a command signal sent from the host computer 1, and in case of the command signal sent from the host computer 1, the program goes to step s3. In case of not a command signal, the program goes to step s6 and the other process is performed.

In step s3, the job number and the parameter included in the command signal are assigned to the electronic cash register C and the finishing code is set to "unactivated". Next in step s4, the operation corresponding to the job number, i.e., the operation of inspection/liquidation is performed. When such an inspection/liquidation operation is completed, the finishing code is set to "normal completion" in step s5 as to be described later.

When such a remote control as described above is performed, it is necessary to confirm in the central processing unit of the host computer 1 whether or not the electronic cash register C is normally operated. For the confirmation as mentioned above, the host computer 1 sends a signal demanding for sending a finishing information to the electronic cash register C.

Figure 9:
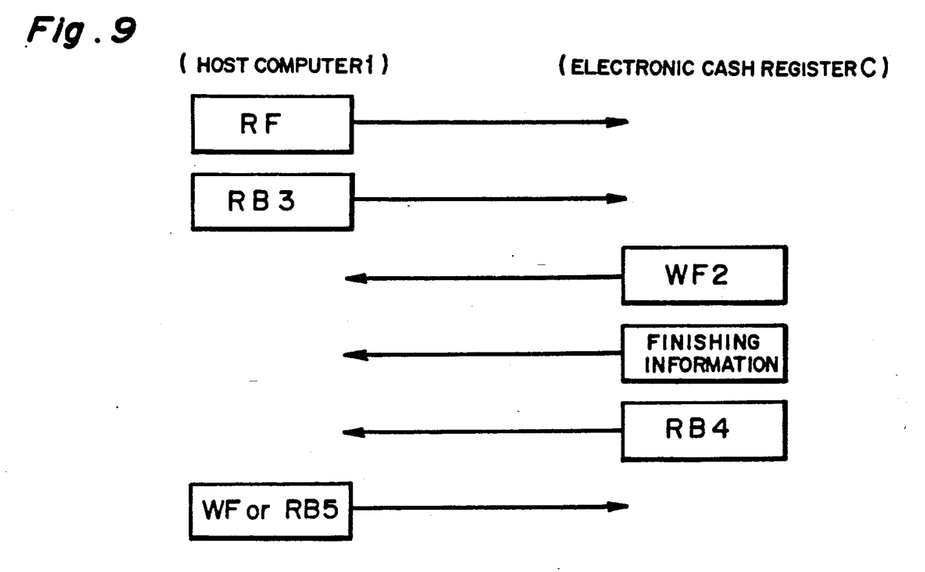
FIG. 9 is a schematic diagram showing flows of the signals when transmitting a signal of finishing information.

FIG. 9 shows a flow of the signals when sending such a finishing information. A demand signal RF demanding for the operation of reading out the finishing information is sent from the host computer 1 to the electronic cash register C. Subsequently, a finishing signal RB3 is sent from the host computer 1 to the electronic cash register C. The electronic cash register C sends a signal WF2 demanding for writing to the host computer 1 before sending the finishing information so as to secure the area for storing the data to be received in the memory means provided in the host computer 1. Subsequently, the electronic cash register C sends a finishing information having a composition as to be described later to the host computer 1. When the transmission of the finishing information is completed, another finishing signal RB4 is sent from the electronic cash register C to the host computer 1.

When the subsequent operation of the electronic cash register C is performed by remote control of the host computer 1, the host computer 1 sends the signal WF1 demanding for writing mentioned above to the electronic cash register C as shown in FIG. 6. When the transmission of the data signal between the host computer 1 and the electronic cash register C is put into the end, the finishing signal RB5 is sent from the host computer 1 to the electronic cash register C.

Figure 10:
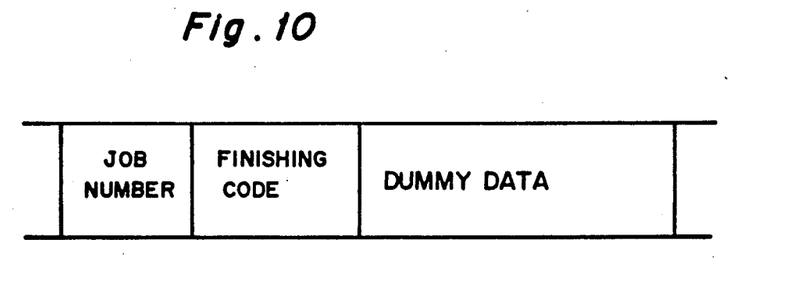
FIG. 10 is a schematic diagram showing an arrangement of a finishing information signal which is sent from the electronic cash register C to the host computer 1.

FIG. 10 shows a composition of the finishing information transmitted from the electronic cash register C to the host computer 1. The finishing information includes data of job numbers, finishing code and dummy data. In the finishing information, the data of the job number and the dummy data are useless and only the finishing code is useful and an examples of the finishing code are shown in the table 2.

The finishing code "0000" represents that the operation corresponding to the command signal sent from the host computer 1 (referred to as command operation) has been normally completed.

The finishing code "0010" represents that the command operation is not yet performed or under performing.

The finishing code "0020" represents that the command operation has not been performed because of the occurrence of the communication error between the electronic cash register C and the additional apparatus M in the case of having an additional apparatus M.

The finishing code "0030" represents that the command operation such as a liquidation or opening process has not been performed because the electronic cash register C is under the opening process.

The finishing code "0040" represents that the command operation of the closing process has not been performed because the electronic cash register C is under the closing process.

The finishing code "0050" represents that the command operation of the closing process has not been performed because the communication between the electronic cash register C and the additional apparatus M is being performed in the case of having an additional apparatus M.

The finishing code "0060" represents the error of the job number included in the command signal sent from the host computer 1.

The finishing code "0070" represents that the command operation such as a transfer of a data of goods has not been performed because the data of the goods has not been entered to be stored.

The finishing code "0080" represents that, in the case of predetermining an operator of the electronic cash register C, because the code of the operator is undefined, the command operation can not be performed.

The finishing code "0090" represents that the command operation of transferring a data signal to the additional apparatus M can not be performed because the additional apparatus M is under registering operation.

The finishing code "0100" represents that the parameter of the command signal sent from the host computer 1 is abnormal.

As described above, the host computer 1 receives the informations whether or not the operation of the electronic cash register C corresponding to the command signal previously sent from the host computer 1 has been normally completed, or the result and reason why the operation can not be performed.

Figure 11:
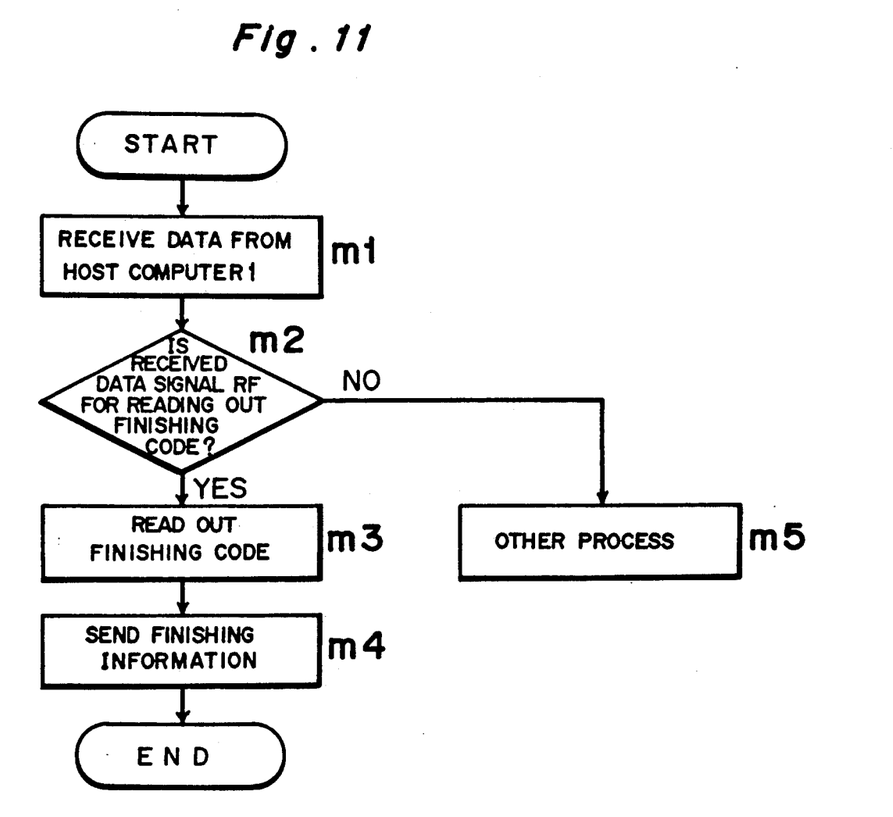
FIG. 11 is a flow chart for explaining an operation of the electronic cash register C when sending a finishing information signal.

FIG. 11 is a flow chart explaining an operation of the electronic cash register C when sending the finishing information. In step m1, the electronic cash register C receives a data signal sent from the host computer 1 and decodes the data. It is judged in step m2 whether or not the received data is a signal RF demanding for reading out a finishing code, and in case of not a signal RF demanding for reading out a finishing code, the program goes to step m5 and other process is performed. In case of the signal RF demanding for reading out a finishing code, the program goes to step m3 and the electronic cash register C reads out the set finishing code. Next in step m4, the finishing information including the finishing code is sent from the electronic cash register C to the host computer 1.

As described above, in this example, the remote control of the electronic cash register C can be performed by sending the command signals from the host computer 1 to the electronic cash register C. Moreover, the electronic cash register C stores the finishing code of the operation performed by remote control as described above, therefore, it can be confirmed in the host computer 1 whether or not the operation corresponding to the command signal sent from the host computer 1 has been normally performed in the electronic cash register C.

As described above, according to the present invention, the central processing unit of the host computer is connected to one or more electronic cash registers through a communication line and the electronic cash register receives a predetermined command signal so as to perform the operation corresponding to the command signal. Accordingly, one or more electronic cash registers can be remote controlled by sending a signal from the central processing unit so that the labor saving of the data transmission device and improvement of the operability thereof can be realized.

TABLE 2

| FINISHING CODE | CONTENT | OBJECTING OPERATION |
| --- | --- | --- |
| 0000 | NORMAL COMPLETION | ALL COMMANDING OPERATIONS |
| 0010 | UN-ACTIVATION OF COMMANDING | ALL COMMANDING OPERATIONS |
| 0020 | COMMUNICATION ERROR TO ADD. M1 TO Mm | ALL COMMANDING OPERATIONS |
| 0030 | IMPOSSIBLE TO RETURN BECAUSE OF OPENING | LIQUIDATION/OPENING PROCESS |
| 0040 | IMPOSSIBLE TO RETURN BECAUSE OF CLOSING | CLOSING PROCESS |
| 0050 | IMPOSSIBLE TO RETURN BECAUSE OF COMMUNICATION TO ADD. M1 TO Mm | CLOSING PROCESS |
| 0060 | JOB NUMBER OF COMMAND ERROR | OPERATION OF TRANSFER OF DATA |
| 0070 | IMPOSSIBLE TO RETURN BECAUSE OF NO DATA OF GOODS | TRANSFER OF DATA OF GOODS |
| 0080 | OPERATOR CODE UNDEFINED | ALL COMMANDING OPERATIONS |
| 0090 | IMPOSSIBLE TO RETURN BECAUSE OF REGISTERING OF ADD. M1 TO Mm | TRANSFER TO ADD. M1 TO Mm |
| 0100 | PARAMETER ERROR OF COMMAND | ALL COMMANDING OPERATIONS |

Note 1. ADD. represents ADDITIONAL APPARATUS.

What is claimed is:

1. A method for selectively sending data from a host computer to a plurality of slave electronic cash registers operatively connected to a master electronic cash register comprising the steps of:
    (a) transmitting command signals from the host computer to a master electronic cash register for a slave electronic cash register operatively connected to said master electronic cash register, said command signals being signals for selectively retrieving specific sales data and/or all data in a divisional file of a memory in the slave electronic cash register, the division file including a plurality of sorting areas with some of said plurality of sorting areas, containing sales data while the remaining sorting areas contain other data; and
    (b) sending instructions from the master electronic cash register to the save electronic cash register based on the specific command signal.

2. The method of claim 1 further comprising the steps of:
    (c) processing the instructions in the slave unit based on the specific command signal, to select sales data and/or other data in the division file;
    (d) sending the selected data from step (c) to the master electronic cash register; and
    (e) forwarding the selected data from step (d) to the host computer for evaluation.

3. A method for selectively controlling data sent from a plurality of electronic cash registers each of the electronic cash registers including a memory with a plurality of division files each division file including a plurality of sorting areas containing sales data and a plurality of sorting areas containing other specific data to be sent to a host computer unit so that unnecessary data is not sent back to the host computer comprising the steps of:
    (a) sending a signal from the host computer unit along at least one transmission line to each one of said plurality of electronic cash registers said signal identifying code data in at least one of said division files sorting areas containing said sales data;
    (b) selecting and receiving said signal in at least one of said plurality of electronic cash registers;
    (c) processing said signals in said at least one cash register so that only the specific selected sales data which is stored in the sorting area of the division files in at least one of said electronic cash registers is sent to said host computer based on said signal identifying code.

4. The method of claim 3 further including the step of sending a signal from separate devices operatively connected to each of the electronic cash registers to turn the operation of a electronic cash register on.

5. The method of claim 3 further including the step of sending a signal from separate devices operatively connected to each the electronic cash registers to turn the operation of the electronic cash register off.

* * * * *